(12) United States Patent
Kinoshita et al.

(10) Patent No.: US 10,328,391 B2
(45) Date of Patent: Jun. 25, 2019

(54) STRUCTURAL BODY

(71) Applicant: NGK Insulators, Ltd., Nagoya (JP)

(72) Inventors: Naoto Kinoshita, Nagoya (JP); Kenichi Noda, Nagoya (JP); Hiroyuki Shibata, Okazaki (JP)

(73) Assignee: NGK Insulators, Ltd., Nagoya (JP)

( * ) Notice: Subject to any disclaimer, the term of this patent is extended or adjusted under 35 U.S.C. 154(b) by 916 days.

(21) Appl. No.: 14/867,100

(22) Filed: Sep. 28, 2015

(65) Prior Publication Data

US 2016/0016121 A1 Jan. 21, 2016

Related U.S. Application Data

(63) Continuation of application No. PCT/JP2014/052318, filed on Jan. 31, 2014.

(30) Foreign Application Priority Data

Mar. 29, 2013 (JP) .................................. 2013-071655

(51) Int. Cl.
*B01D 46/24* (2006.01)
*B01D 63/06* (2006.01)

(52) U.S. Cl.
CPC ......... *B01D 63/066* (2013.01); *B01D 46/247* (2013.01)

(58) Field of Classification Search
CPC .............................. B01D 63/066; B01D 46/247
USPC ......................................................... 210/501
See application file for complete search history.

(56) References Cited

U.S. PATENT DOCUMENTS

| 7,585,347 | B2 | 9/2009 | Isomura et al. |
| 2005/0274096 | A1 | 12/2005 | Yamada et al. |
| 2006/0213165 | A1 | 9/2006 | Isomura et al. |
| 2010/0242424 | A1 | 9/2010 | Harada et al. |
| 2012/0018370 | A1 | 1/2012 | Takahashi et al. |

FOREIGN PATENT DOCUMENTS

| EP | 0 937 398 A1 | 8/1999 |
| EP | 1 604 726 A1 | 12/2005 |
| EP | 1 704 909 A2 | 9/2006 |
| EP | 2 409 756 A1 | 1/2012 |
| JP | 11-349423 A1 | 12/1999 |
| JP | 2001-137673 A1 | 5/2001 |

(Continued)

OTHER PUBLICATIONS

K.A. Stoitsas, et al., "Porous Ceramic Membranes for Propane-Propylene Separation via the π-Complexation Mechanism: Unsupported Systems," Microporous and Mesoporous Materials, vol. 78 (2005), pp. 235-243.

(Continued)

*Primary Examiner* — Vishal V Vasisth
(74) *Attorney, Agent, or Firm* — Burr & Brown, PLLC

(57) ABSTRACT

A structural body 10 includes a porous partition portion 14 forming a plurality of cells 12 each of which is used as a flow path of a mixed gas as a fluid; a function layer 16 provided on each inside surface 15 of the partition portion 14; a protective layer 18 provided on each inside surface end portion 15a of the inside surface 15; and a sealing portion 19 provided on each end surface 17 of the partition portion 14. The function layer 16 contains metal ions, and is transformed by light. The protective layer 18 is a length B (mm) from an end surface 11 of the structural body 10 and a maximum length A (mm) of an opening of the cell 12 satisfy the relationship of B/A≥0.4.

10 Claims, 2 Drawing Sheets

(56) References Cited

FOREIGN PATENT DOCUMENTS

| JP | 2002-332206 A1 | 11/2002 |
|---|---|---|
| JP | 2006-263498 A1 | 10/2006 |
| JP | 2009-189900 A1 | 8/2009 |
| JP | 2009-214075 A1 | 9/2009 |
| JP | 2010-227767 A1 | 10/2010 |
| JP | 2010-269268 A1 | 12/2010 |
| JP | 2012-045490 A1 | 3/2012 |

OTHER PUBLICATIONS

International Search Report and Written Opinion (Application No. PCT/JP2014/052318) dated Apr. 1, 2014.
Extended European Search Report (Application No. 14776237.1) dated Nov. 7, 2016.
English Translation of International Preliminary Report on Patentability (Application No. PCT/JP2014/052318) dated Oct. 8, 2015.

STRUCTURAL BODY

This application is a CON of PCT/JP2014/052318, filed Jan. 31, 2014.

BACKGROUND OF THE INVENTION

1. Field of the Invention

The present invention relates to a structural body.

2. Description of the Related Art

Heretofore, various functions of metal ions have drawn attention and have been practically used. For example, an improvement in antibacterial/antimold properties of a total heat exchange element by the use of silver ions and/or zinc ions has been proposed (see PTL 1). In addition, there has been proposed separation of a paraffin, such as propane, and an olefin, such as propylene, by the use of a membrane formed by modifying a thin film having micropores or mesopores with silver ions (see NPL 1).

CITATION LIST

Patent Literature

PTL 1: Japanese Unexamined Patent Application Publication No. 2009-189900 Non Patent Literature
NPL 1: Microporous and Mesoporous Materials, 78 (2005) 235 to 243

SUMMARY OF THE INVENTION

However, since having low stability against light, metal ions, such as silver ions, are liable to be transformed by light exposure in some cases. Hence, special handling in order to prevent light exposure is required not only in every step from production of products to use thereof but also in use environment of the products, and hence, an easy handling product has been desired which requires no special handling as described above.

The present invention was made to solve the problem as described above, and a primary object of the present invention is to provide an easy handing structural body using a material which includes metal ions and which is transformed by light.

In order to achieve the above primary object, the present invention employs the following means.

A structural body of the present invention is a structural body comprising:

a porous partition portion which forms at least one cell to be used as a flow path of a fluid;

a function layer which is provided on each inside surface of the partition portion, which contains metal ions, and which is transformed by light; and a protective layer which is provided at each end portion of the inside surface of the partition portion and which is not transformed by light, and in this structural body, when the maximum length of an opening of the cell is represented by A (mm), and the length of the protective layer from each end surface of the structural body is represented by B (mm), the relationship of $B/A \geq 0.4$ is satisfied.

Although this structural body is configured to perform a predetermined treatment on a fluid using the function layer by allowing the fluid to pass through the cell, since the predetermined protective layer is provided at each end portion of the inside surface of the partition portion, light is not likely to reach deep inside of the cell. Hence, the intensity of light to be irradiated on the function layer which contains metal ions and which is transformed by light can be reduced, and light transformation of the function layer can be suppressed, so that the function of the function layer can be sufficiently obtained. As a result, specific handling in order to prevent light exposure is not required, and an easy handling structural body can be provided.

In the structural body of the present invention, between the above A and the above B, the relationship of $B/A \geq 1.0$ may be satisfied, or the relationship of $B/A \geq 2.0$ may also be satisfied. In the structural body as described above, light is more difficult to reach deep inside of the cell.

In the structural body of the present invention, the metal ions may include silver as a metal species. Since having antibacterial/antimold properties, silver ions are suitably used for air cleaning and water cleaning and, in addition, are also suitably used for separation of an unsaturated hydrocarbon, so that silver ions may be used for various applications.

In the structural body of the present invention, the function layer may include a support portion which is bonded to an inorganic framework and/or an organic framework and which is able to support the metal ions, and the metal ions may be supported by the support portion. In the structural body as described above, a function layer containing metal ions can be relatively easily formed, and the stability of metal ions in the function layer is improved.

In the structural body of the present invention, the function layer may also function as a membrane for separation.

In the structural body of the present invention, the maximum length A of the opening of the cell may be set to 0.5 to 10 mm.

In the structural body of the present invention, the cell may have a cross-sectional shape selected from at least one of a polygon having at least four corners, an ellipse, and a circle. In the structural body as described above, since an acute angle is not formed in the cell, a filtrated cake can be easily removed.

In the structural body of the present invention, the protective layer may be directly provided on the inside surface of the partition portion. In the structural body as described above, the adhesion between the inside surface of the partition portion and the protective layer is improved, and in addition, since the function layer is not required to be formed at a portion at which the protective layer is formed, the material can be saved.

In the structural body of the present invention, the protective layer may be formed of a dense material. Incidentally, this dense material is dense so as not to allow a fluid to be processed to pass therethrough. In the structural body as described above, since no fluid enters the partition portion through the portion at which the protective layer is provided, the fluid is not allowed to enter the partition portion without passing through the function layer.

In the structural body of the present invention, the protective layer may have a slope so that the thickness thereof tends to increase from an end at a function layer side to an end at an end surface side of the structural body, and in a region of 0.1 mm from the end at the function layer side, an angle θ of the slope to the inside surface of the partition portion may be set to 450 or less. In the structural body as described above, even if the structural body is exposed to a heat environment and a dry environment during production and use thereof, stress concentration can be suppressed, for example, at a boundary between the function layer and the end of the protective layer at the function layer side, so that cracks are not likely to be generated at the boundary as described above and the vicinity thereof (in particular, in the function layer).

In the structural body of the present invention, the number of the cells may be at least two, and the standard deviation of the B/A among the above at least two cells may be set to 0.01 to 1.0. When the standard deviation is 0.01 or more, even if the structural body is exposed to a heat environment during production and use thereof, since the stress concentration can be suppressed, for example, at a boundary between the protective layer and the partition portion, so that cracks are not likely to be generated at the boundary as described above and the vicinity thereof (in particular, in the partition portion). In addition, when the standard deviation is 1.0 or less, since no cells having an excessively small B/A value are present, the function layer can be further suppressed from being transformed.

DESCRIPTION OF THE PREFERRED EMBODIMENTS

Figure 1:
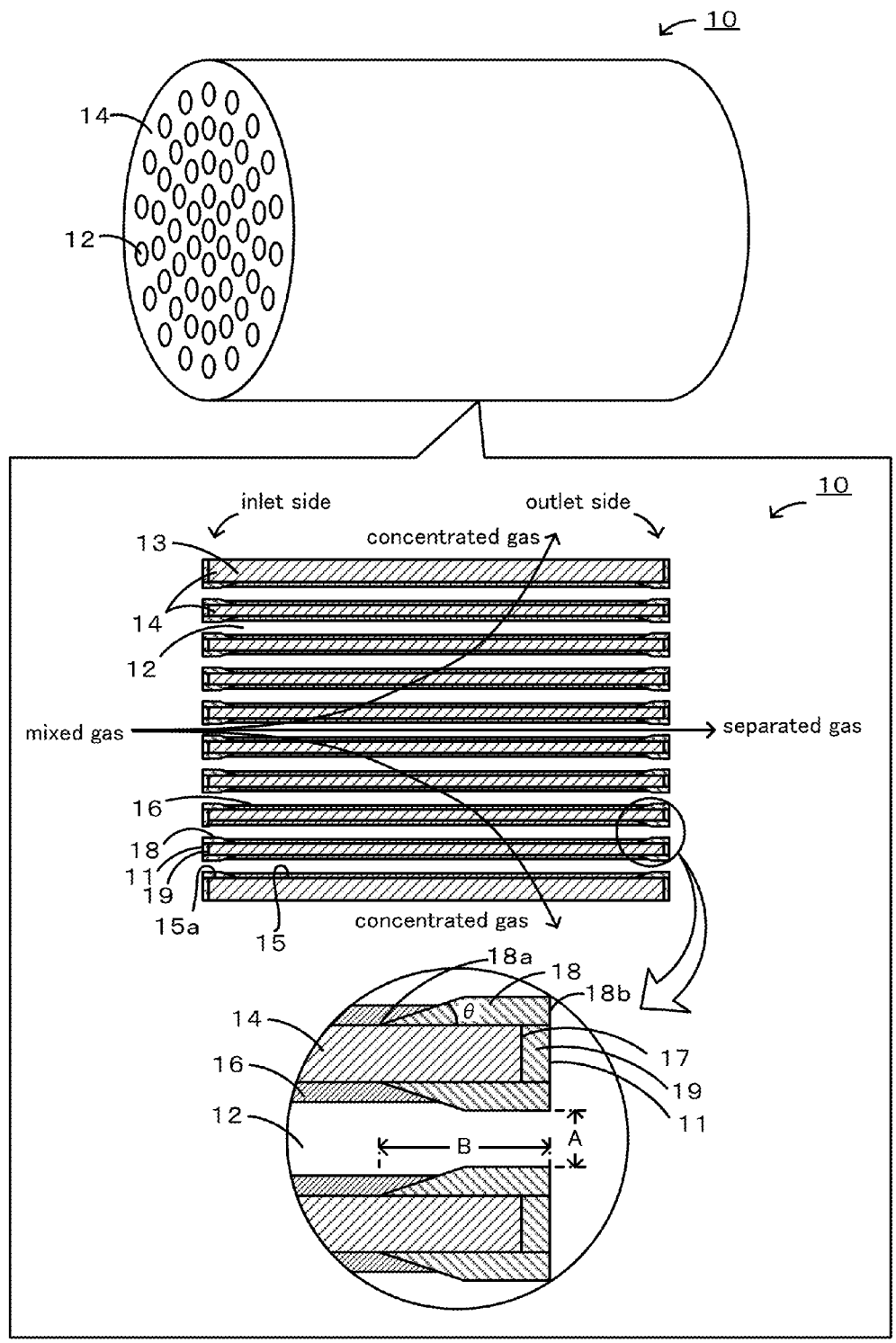
FIG. 1 is a schematic view illustrating one example of the structure of a structural body 10.
Figure 2:
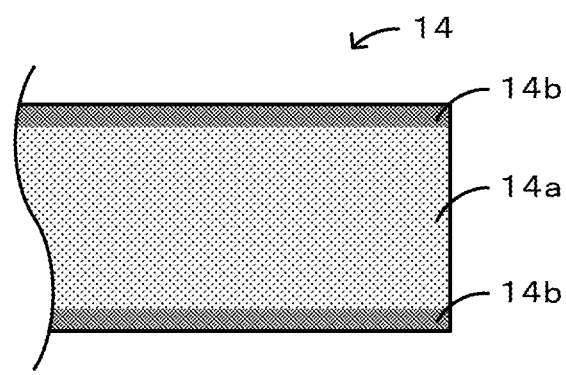
FIG. 2 is an explanatory view showing one example of the structure of a partition portion 14.

One embodiment of a structural body of the present invention will be described with reference to the drawings. FIG. 1 is a schematic view illustrating one example of the structure of a structural body 10 which is one embodiment of the structural body of the present invention. FIG. 2 is an explanatory view showing one example of the structure of a partition portion 14.

The structural body 10 of this embodiment includes, as shown in FIG. 1, a porous partition portion 14 forming a plurality of cells 12 each functioning as a flow path of a mixed fluid; a function layer 16 provided on each inside surface 15 of the partition portion 14; a protective layer 18 provided on each inside surface end portion 15a of the inside surface 15; and a sealing portion 19 provided on each end surface 17 of the partition portion 14. In this structural body 10, the function layer 16 functions as a membrane which separates a mixed fluid. In particular, in a mixed fluid which enters the cell 12 from an inlet side, a fluid capable of passing through the function layer 16 is condensed after passing through the porous partition portion 14 on which the function layer 16 is formed and is then discharged as a condensed fluid from an outer surface of the structural body 10. In contrast, a fluid not capable of passing through the function layer 16 is allowed to flow along the path of the cell 12 and is discharged as a separated fluid at an outlet side of the cell 12. In addition, the mixed fluid may include either a fluid containing at least two types of gases or a fluid containing at least two types of liquids. In addition, a fluid containing a gas and a liquid, a fluid containing a gas and a solid (powder), a fluid containing a liquid and a solid, and a fluid containing a gas, a liquid, and a solid may also be included.

This structural body 10 has a monolithic structure including a plurality of cells 12. The outer shape of the structure is not particularly limited, and for example, a circular column, an elliptic column, a quadrangular column, and a hexagonal column may be used.

The cell 12 is a path extending along the axial direction of the structural body 10 and may be either a penetrating through-hole or a path having one sealed end. In addition, in some of the cells 12, two ends thereof may be sealed, and slits communicating with an outside space may be formed in the partition portion 14. In the structural body having some cells of which the two ends are sealed and the slits are formed in the partition portion 14, a fluid capable of passing through the function layer 16 can be efficiently discharged from the outer surface of the structural body 10 through the slits. As a cross-sectional shape of the cell 12, a polygonal shape, such as a triangle, a quadrangle, a pentagon, a hexagon, or an octagon, a streamline shape, such as a circle or an ellipse, or a shape in combination thereof may be used. Among those mentioned above, at least one of a polygon having at least four corners, an ellipse, and a circle is preferable. The reason for this is that since an acute angle is not formed in the cell 12, a filtrated cake can be easily removed.

The partition portion 14 functions as a substrate supporting the function layers 16 and is formed of a porous material so as not to prevent the flow of a fluid. Although the pore diameter thereof may be appropriately determined in consideration of the balance between the mechanical strength and the filtration resistance and the like, for example, the pore diameter may be set to approximately 0.001 µm to several hundreds of micrometers. In this embodiment, the pore diameter indicates the average pore diameter, and measurement thereof may be performed by a method suitable for the size of the pore diameter (such as a gas adsorption method, a mercury intrusion method, or SEM observation). The partition portion 14 may contain an organic material, such as a resin, or an inorganic material. The partition portion 14 containing an inorganic material may be formed, for example, from at least one inorganic material selected from cordierite, Si-bonded SiC, re-crystallized SiC, aluminum titanate, mullite, silicon nitride, sialon, zirconium phosphate, zirconia, titania, alumina, and silica. Among those mentioned above, alumina and titania are preferable. The reason for this is that the advantages, such as easy availability of raw materials, relatively easy control of the pore diameter of the partition portion 14, and high corrosion resistance, can be obtained.

For example, this partition portion 14 may have a two-layer structure, as shown in FIG. 2, in which a fine particle portion 14b having a small pore diameter is formed on the surface of a coarse particle portion 14a having a large pore diameter. The pore diameter of the coarse particle portion 14a may be appropriately determined in consideration of the balance between the mechanical strength and the filtration resistance or the like and may be set to, for example, approximately 0.1 µm to several hundreds of micrometers. The pore diameter of the fine particle portion 14b may be smaller than that of the coarse particle portion 14a and may be set to, for example, approximately 0.001 to 1 µm. In the partition portion 14 having a two-layer structure as described above, since the pore diameter thereof is large as a whole because of providing the coarse particle portion 14a, the filtration resistance can be reduced. In addition, since the fine particle portion 14b is provided, the surface of the partition portion 14 becomes smooth, and the function layer 16 and the protective layer 18 can be uniformly formed. In this embodiment, a material of the coarse particle portion 14a may be either the same type as or a different type from that of the fine particle portion 14b. The partition portion 14 having a two-layer structure as described above may be formed, for example, by a method as described below. First, the coarse particle portion 14a is formed. In particular, the coarse particle portion 14a can be formed by a method in which an aggregate and a dispersant are mixed together with an additive, such as a surfactant, if necessary, and are then kneaded to form a paste, and subsequently, this paste is molded, is dried, and is fired. The pore diameter may be controlled, for example, by adjusting the average particle diameter of the aggregate. Subsequently, the fine particle portion 14b is formed on the surface of the coarse particle portion 14a. In particular, the fine particle portion 14b can be obtained by a method in which an aggregate and a dispersant are mixed together with an additive, such as a surfactant, if necessary, to prepare a slurry, and subsequently, this slurry is applied on the surface of the coarse particle portion 14a, is dried, and is fired. In addition, the partition portion 14 may not have a two-layer structure and for example, may have a layer structure having at least three layers in which for example, an intermediate layer having an intermediate pore diameter is provided between the coarse particle portion 14a and the fine particle portion 14b; a gradient material structure in which the pore diameter is continuously changed; or a single layer structure.

The function layer 16 functions as a membrane separating a mixed fluid to be processed. This function layer 16 is provided on each inside surface 15 of the partition portion 14 and may be formed, for example, to have a film shape or a particle layer shape. This function layer 16 contains metal ions and is transformed by light. For example, the function layer 16 may contain metal ions which are transformed by light. Although the type of metal ions is not particularly limited, the function layer 16 preferably contains as the metal species, gold, silver, copper, platinum, palladium, nickel, cobalt, iron, an alkali metal, or the like and more preferably contains silver. The reason for this is that silver ions are particularly suitable for separation of an unsaturated hydrocarbon. The thickness of the function layer 16 may be set to, for example, approximately 0.01 to 10 μm.

This function layer 16 has a support portion bonded to an inorganic framework and/or an organic framework and capable of supporting metal ions, and metal ions may be supported by this support portion. As the inorganic framework, for example, there may be mentioned a framework having a chain structure or a three-dimensional structure in which metal elements, such as silicon, titanium, aluminum, and zirconium, are bonded to each other with oxygen or the like interposed therebetween. As the organic framework, a known resin, such as a polystyrene, an acryl, an epoxy, a polyester, a polyamide, a polyimide, a polyurethane, a polysulfone, a polyether, or a polyether sulfone, may be mentioned. As the support portion, for example, a cation exchange group, such as a carboxyl group, a sulfone group, a phosphate group, a phosphonate group, or a phenolic hydroxyl group, may be mentioned. The function layer 16 as described above may be formed, for example, as described below. First, a sol used as a raw material is prepared. This sol may be prepared by hydrolysis and polymerization of a metal alkoxide having a cation exchange group or by performing hydrolysis and polymerization after a metal alkoxide is added to a solution of a polymer having cation exchange groups. The sol thus obtained is formed into a film on the inside surface 15 of the partition portion 14, and drying and firing of the film are then performed. The film formation, the drying, and the firing are repeatedly performed at least one time, so that a film can be formed having a cation exchange group which is bonded to an organic/inorganic hybrid framework and which can be bonded to metal ions. If desired metal ions are supported by the cation exchange groups, this film itself may be used as the function layer 16. In contrast, if desired metal ions are not supported by the cation exchange groups, by performing ion exchange using a solution containing desired metal ions, this film may be formed into a function layer 16 supporting desired metal ions.

The protective layer 18 is provided on each inside surface end portion 15a of the partition portion 14. In particular, when the maximum length of an opening of the cell 12 is represented by A (mm), and the length from the end surface 11 of the structural body 10 is represented by B (mm), the protective layer 18 is provided so as to satisfy the relationship of B/A≥0.4. In this embodiment, the opening of the cell 12 indicates a portion of the cell 12 at which the protective layer 18 is provided and at which the cross-sectional area of the flow path of a fluid is most decreased. In addition, in the case in which when two points of the circumference (the surface of the protective layer 18) of the opening of the cell 12 are connected to each other by a liner line, the maximum length therebetween is defined as the maximum length A of the opening of the cell 12. The maximum length A of the opening of the cell 12 as described above can be measured by magnification observation using an optical microscope in a horizontal direction from the outside of the end surface 11 of the structural body 10 to the flow path of a fluid. If the measurement is difficult to perform, a cross-section including the opening of the cell 12 and being perpendicular to the flow path of a fluid may be measured by magnification observation using an optical microscope. The maximum length A of the opening of the cell 12 is preferably 0.5 mm to 10 mm. The reasons for this are that when the maximum length A of the opening of the cell 12 is smaller than 0.5 mm, the permeation resistance of a fluid which enters the cell or flows therein is increased, and when the maximum length A of the opening of the cell 12 is more than 10 mm, since the number of cells to be arranged per volume of the structural body is decreased, the inside surface area is decreased, so that the treatment efficiency per volume of the structural body is degraded. The length B from the end surface 11 of the structural body 10 can be measured by magnification observation of a cross-section parallel to the flow path of a fluid using an optical microscope. When the variation in length B is observed in one cell, the length of a shortest portion of the protective layer 18 from the end surface may be measured.

The value of B/A described above may satisfy the relationship of B/A≥20.4, preferably satisfies the relationship of B/A≥1.0, and more preferably satisfies the relationship of B/A≥2.0. When the relationship of B/A≥0.4 is satisfied, light transformation of the function layer 16 can be suppressed. In addition, although the upper limit of B/A is not particularly limited, for example, B/A≤10 is preferable. The reason for this is that when B/A≤10 is satisfied, since the area rate of the protective layer 18 to the inside surface 15 of the partition portion 14 is not excessively large, the area of the function layer 16 functioning as a membrane for separation can be sufficiently ensured. In this embodiment, in order to determine whether the value of B/A satisfies the above relationship or not, the values at an inlet side and an outlet side are each investigated, and the determination is performed whether the relationships at the above two sides are both satisfied or not. In addition, in this case, when the number of the cells 12 is 50 or less, the values of B/A of all the cells are obtained, or when the number of the cells 12 is more than 50, the values of B/A of 50 cells which are randomly selected are obtained, and the average value is then obtained therefrom. Subsequently, whether the above relationship is satisfied or not is determined using the average value described above. In addition, at both the inlet side and the outlet side, all values of B/A of all cells 12 more preferably satisfy the above relationship.

In addition, the standard deviation of B/A among the cells 12 is preferably 0.01 to 1.0. The reason for this is that when the standard deviation is 0.01 or more, even if the structural body is exposed to a heat environment during production or use thereof, the stress concentration at a boundary between the protective layer 18 and the partition portion 14 or the like can be suppressed, and hence, cracks are not likely to be generated at the boundary as described above and/or the vicinity thereof (in particular, in the partition portion). In addition, the reason for this is also that when the standard deviation is 1.0 or less, since cells having an excessively small value of B/A are not present, the function layer can be further suppressed from being transformed. In this case, in order to determine whether the standard deviation of B/A is within the range described above or not, the standard deviations at the inlet side and the outlet side are investigated, and the determination is made whether the standard deviations at the both sides are within the above range or not. In addition, in this case, when the number of the cells 12 is 50 or less, the values of B/A of all the cells are obtained, or when the number of the cells 12 is more than 50, the values of B/A of 50 cells which are randomly selected are obtained, and subsequently, whether the standard deviation obtained therefrom is within the above range or not is determined. In addition, at both the inlet side and the outlet side, the standard deviation obtained from all values of B/A of all cells 12 is more preferably within the above range.

The thickness of this protective layer 18 is preferably, for example, 0.1 to 1,000 μm and more preferably 0.2 to 300 μm. The reasons for this are that when the thickness is 0.1 μm or more, the formation of the protective layer can be easily performed, and when the thickness is 1,000 μm or less, the flow of a gas in the vicinity of the inlet or the outlet of the cell 12 is not likely to be prevented. In addition, the protective layer 18 has a slope so that the thickness thereof tends to increase from an end 18a at a function layer 16 side to an end 18b at an end surface 11 side of the structural body 10, and in a region of 0.1 mm from the end 18a at the function layer 16 side, an angle θ of the slope to the inside surface 15 of the partition portion 14 is preferably 45° or less. The reason for this is that in the case as described above, even if the structural body is exposed to a heat environment during production or use thereof, the stress concentration can be suppressed, for example, at a boundary between the function layer 16 and the end 18a of the protective layer at the function layer 16 side, and hence, cracks are not likely to be generated at the boundary as described above and/or the vicinity thereof (in particular, in the function layer).

This protective layer 18 is not transformed by light and may be formed, for example, from a glass, a ceramic, a resin, or a metal. Among those mentioned above, when a dense material such as a glass is used, since a fluid is not allowed to enter the partition portion 14 from a portion at which the protective layer 18 is provided, the fluid is not allowed to pass only through the partition portion 14 without passing through the function layer 16, so that the separation property can be further improved. Although the protective layer 18 may be provided on the inside surface 15 of the partition portion 14 with the function layer 16 interposed therebetween, the protective layer 18 is preferably directly provided on the inside surface 15 of the partition portion 14. The reasons for this are that the adhesion between the inside surface of the partition portion 14 and the protective layer is improved, and since the function layer 16 is not required to be formed at a portion at which the protective layer 18 is formed, the material can be saved. In addition, in order to directly form the protective layer 18 on the inside surface 15 of the partition portion 14, for example, after the protective layer 18 is formed on the inside surface end portion 15a of the partition portion 14, the function layer 16 may be formed.

This protective layer 18 may be formed, for example, in such a way that a slurry containing raw materials is applied to the inside surface end portion 15a of the partition portion 14 and dried, and if necessary, a firing or a curing treatment is then performed. The slurry containing raw materials may contain a solvent, an organic binder, and the like besides raw materials, such as a glass powder, a ceramic powder, and/or a resin powder. In addition, the slurry may be a precursor slurry containing a precursor of the protective layer 18. An application method is not particularly limited, and for example, a method may be used in which a sponge having a predetermined thickness is impregnated with the slurry described above and is then pressed to the inlet side or the outlet side of the partition portion 14 by stamping for application. In addition, there may also be used a method in which the inlet side or the outlet side of the partition portion 14 is immersed in the slurry described above by dipping to a predetermined depth for application. In addition, application may also be performed by spray or the like. Among those methods described above, stamping and dipping are preferable since the length B can be relatively easily controlled.

The sealing portion 19 functions to prevent the flow of a fluid into and out of the end surface 17 of the partition portion 14 and is provided at each end surface 17 of the partition portion 14. As a material of this sealing portion 19, a material similar to that of the protective layer 18 may be used. This sealing portion 19 may be formed integrally with the protective layer 18 described above.

According to the structural body 10 of the embodiment described above, since the protective layer 18 is provided on each inside surface end portion 15a of the partition portion 14, and the relationship of B/A≥0.4 is satisfied, light is not likely to reach deep inside of the cell 12. Hence, the intensity of light irradiated on the function layer 16 which contains metal ions and which is transformed by light is reduced, and light transformation of the function layer 16 can be suppressed, so that the separation property thereof can be sufficiently obtained. As a result, a special handling in order to prevent light exposure is not required, and hence, an easy handling structural body can be provided. In addition, since the structural body 10 has a monolithic shape including a plurality of the cells 12, compared to a tubular shape having one cell, the area of the function layer per unit volume is large, and the separation efficiently of a mixed fluid is excellent. The structural body 10 as described above may be used, for example, as a membrane element including the function layer 16 as a membrane for separation.

In addition, the present invention is not limited at all to the embodiment described above and, of course, may be performed in various modes without departing from the technical scope of the present invention.

For example, in the above embodiment, although the structural body 10 has a monolithic shape including a plurality of the cells 12, a tubular shape including one cell may also be used.

In the embodiment described above, although the function layer 16 is configured to function as a membrane separating a mixed fluid used as a fluid, the function layer 16 may be configured to function as a sterilization/purification membrane for sterilizing and purifying a liquid and/or a gas. The structural body 10 having the function layer 16 functioning as a sterilization/purification membrane may be used as a sterilization/purification filter.

EXAMPLES

Hereinafter, examples in each of which the structural body 10 was concretely formed will be described as Experimental Examples. In addition, Experimental Examples 1 to 3, 5 to 9, 11 to 15, 17 and 18 correspond to the examples of the present invention, and Experimental Examples 4, 10, and 16 correspond to Comparative Examples.

Experimental Examples 1 to 18

1. Formation of Structural Body 10

(A) Formation of Partition Portion 14
(A-1) Formation of Coarse Particle Portion 14a
Alumina particles having an average particle diameter of 50 μm were used as an aggregate, and an organic binder and water were added to the above aggregate and then kneaded therewith, so that a paste was obtained. Next, by the use of a plunger-type extruder, the paste thus obtained was molded by extruding, so that a molded body having an outer diameter of 30 mm and a length of 160 mm and including cells each having a circular cross-section was obtained. Subsequently, the molded body thus obtained was dried at 100° C. for 24 hours using a hot wind circulation type drier and was then fired using an electric furnace, so that the coarse particle portion 14a was obtained. The firing conditions were set so that the temperature was 1,500° C., the firing time was 1 hour, and the temperature rise and drop rates were each 100° C./hour.
(A-2) Application of Slurry for Forming Fine Particle Portion
Alumina particles having an average particle diameter of approximately 10 nm were used as an aggregate, and a dispersant was added to 30 percent by mass of the alumina particles, so that a slurry for forming a fine particle portion was prepared. In addition, this slurry for forming a fine particle portion was applied to the surface of the coarse particle portion 14a. An application method was performed in accordance with a method for manufacturing a multilayer film disclosed in Japanese Examined Patent Application Publication No. 63-66566 (excluding firing).
(A-3) Firing
Firing was performed in an air atmosphere using an electric furnace, so that the fine particle portion 14b was formed. As the firing conditions, the firing was performed at 1,200° C. for 1 hour, and the temperature rise and drop rates were each set to 100° C./hour. As described above, the partition portion 14 having the coarse particle portion 14a and the fine particle portion 14b was obtained. In addition, the fine particle portion 14b was formed as a layer having an extremely small thickness of approximately 250 μm.
(B) Formation of Protective Layer 18 and Sealing Portion 19
As a material of the protective layer 18, a slurry for forming a protective layer was prepared in such a way that 2 parts by mass of a methyl cellulose as an organic binder was added to 100 parts by mass of a glass powder having an average particle diameter of 10 μm, and after water was further added thereto, mixing was performed. Subsequently, after a sponge was uniformly impregnated with this slurry for forming a protective layer, this slurry was applied to the end surfaces and the inside surface end portions 15a of the partition portion 14 by pressing the sponge thereto. Next, firing was performed in an air atmosphere using an electric furnace, so that the protective layers 18 and sealing portions 19 were formed. As the firing conditions, the firing was performed at 1,000° C. for 1 hour, and the temperature rise and drop rates were each set to 100° C./hour. As described above, the protective layer 18 and the sealing portion 19 were integrally formed on each inside surface end portion 15a of the partition portion 14. The thickness of the protective layer 18 and that of the sealing portion 19 were each approximately 100 μm. In addition, in this process, the amount of the slurry for forming a protective layer and the region to which the slurry was to be applied were adjusted so that the maximum length (diameter) A of the opening of the cell 12 and the length B from the end surface 11 of the structural body 10 were as shown in Table 1.
(C) Formation of Function Layer 16
(C-1) Sol Preparation
After 1 g of nitric acid was added to 8 g of an aqueous solution containing 25 percent by mass of sodium carboxyethylsilanetriol, a heat treatment was performed at 60° C. for 6 hours in a water bath so as to proceed hydrolysis and polymerization.
(C-2) Film Formation
By the use of the sol thus obtained, film formation was performed in accordance with one example disclosed in Japanese Unexamined Patent Application Publication No. 2012-40549. In particular, first, the outer surface of the partition portion 14 on which the protective layers 18 were formed was masked with a masking tape. Subsequently, the partition portion 14 was fixed to a flow-down device for film formation. In addition, the sol thus formed was received in a tank of the flow-down device for film formation and was then allowed to flow thereinto from an upper side thereof so as to pass through the cells 12. Subsequently, a wind having a velocity of 5 m/s was supplied from the upper side, so that an excessive sol was removed.
(C-3) Drying
Furthermore, drying was performed in accordance with one example disclosed in Japanese Unexamined Patent Application Publication No. 2012-40549. In particular, by the use of a dehumidification air blower, within 30 seconds after the film formation, a wind at room temperature was allowed to pass through the inside of the cells 12 of the partition portion 14 to which the sol was supplied and adhered, and drying was performed for 30 minutes. In this case, the wind velocity was set to 5 to 20 m/s, and the wind dew point was set to −70° C. to 0° C.
(C-4) Firing
Firing was performed in an air atmosphere using an electric furnace so that a temperature of 150° C. was held for 2 hours.
The film formation, the drying, and the firing described in the above (C-2) to (C-4) were repeatedly performed six times in total.
(C-5) Ion Exchange
The outer surface of the partition portion 14 was masked with a masking tape. Subsequently, by the use of a liquid supply pump, an $AgBF_4$ aqueous solution at a concentration of 0.5 mol/L was supplied from a lower portion (an inlet side or an outlet side) of the partition portion 14 and was filled to the top end (the outlet side or the inlet side) of each cell 12, and the partition portion 14 was then left for 24 hours under the condition described above. Subsequently, the $AgBF_4$ aqueous solution was discharged from the lower portion of the partition portion 14 by a liquid supply pump. Next, drying was performed in accordance with the drying of (C-3). The conditions in this case were set so that the wind velocity was 2 m/s, and the wind temperature was 23° C.

2. Light Resistance Acceleration Test

A light resistance acceleration test was performed on the structural body of each of Experimental Examples 1 to 18 using a xenon-type weather meter. The discoloration degree of the function layer was observed by visual inspection at 12 hours, 24 hours, and 48 hours after the start of the irradiation. In the structural body of each of the Experimental Examples 1 to 18, the protective layer 18 had a slope having an angle θ of 450 or less to the inside surface 15 of the partition portion 14 in a region of 0.1 mm from the end 18a at the function layer 16 side. In addition, the standard deviation of B/A among the cells was 0.01 to 1.0.

In Table 1, the results of the light resistance acceleration test are shown. In Table 1, x indicates discoloration, Δ indicates slight discoloration, and ○ indicates no discoloration. According to the results thus obtained, it was found that when B/A≥0.4 was satisfied, no discoloration occurred for at least 12 hours, and transformation of the function layer was difficult to occur. It was found that when B/A≥1.0 was satisfied, no discoloration occurred for at least 24 hours, and transformation of the function layer was more difficult to occur. Furthermore, when B/A≥2.0 was satisfied, no discoloration occurred for at least 48 hours, and transformation of the function layer was further difficult to occur.

TABLE 1

| | forming conditions | | | discoloration degree※ | | |
|---|---|---|---|---|---|---|
| | A | B | B/A | irradiation time | | |
| | mm | mm | — | 12 h | 24 h | 48 h |
| Experimental Example 1 | 0.5 | 0.3 | 0.60 | ○ | Δ | X |
| Experimental Example 2 | 0.5 | 0.6 | 1.20 | ○ | ○ | Δ |
| Experimental Example 3 | 0.5 | 1.2 | 2.40 | ○ | ○ | ○ |
| Experimental Example 4 | 1.5 | 0.5 | 0.33 | Δ | X | X |
| Experimental Example 5 | 1.5 | 1.0 | 0.67 | ○ | Δ | X |
| Experimental Example 6 | 1.5 | 1.5 | 1.00 | ○ | ○ | Δ |
| Experimental Example 7 | 2.5 | 1.0 | 0.40 | ○ | Δ | X |
| Experimental Example 8 | 2.5 | 1.5 | 0.60 | ○ | Δ | X |
| Experimental Example 9 | 2.5 | 2.0 | 0.80 | ○ | Δ | X |
| Experimental Example 10 | 3.5 | 1.0 | 0.29 | X | X | X |
| Experimental Example 11 | 3.5 | 2.5 | 0.71 | ○ | Δ | X |
| Experimental Example 12 | 3.5 | 4.0 | 1.14 | ○ | ○ | Δ |
| Experimental Example 13 | 4.5 | 3.0 | 0.67 | ○ | Δ | X |
| Experimental Example 14 | 4.5 | 4.0 | 0.89 | ○ | Δ | X |
| Experimental Example 15 | 4.5 | 5.0 | 1.11 | ○ | ○ | Δ |
| Experimental Example 16 | 5.5 | 2.0 | 0.36 | X | X | X |
| Experimental Example 17 | 5.5 | 9.0 | 1.64 | ○ | ○ | Δ |
| Experimental Example 18 | 5.5 | 16.0 | 2.91 | ○ | ○ | ○ |

※X: discoloration Δ: slight discoloration ○: no discoloration

The present application claims priority from Japanese Patent Application No. 2013-071655 filed on Mar. 29, 2013, the entire contents of which are incorporated herein by reference.

INDUSTRIAL APPLICABILITY

The present invention is applicable to a technical field which performs such as concentration, separation, and purification of a fluid.

What is claimed is:

1. A structural body comprising:
   a porous partition portion which forms at least one cell to be used as a flow path of a fluid;
   a function layer which is provided on an inside surface of the partition portion, which contains a metal ion, and which is transformed by light; and
   a protective layer which is provided at an end portion of the inside surface of the partition portion and which is not transformed by light,
   wherein the protective layer is directly provided on the inside surface of the partition portion,
   wherein the protective layer has a slope so that the thickness thereof increases from one end at a function layer side to an end at an end surface side of the structural body, and in a region of 0.1 mm from the end at the function layer side, an angle θ of the slope to the inside surface of the partition portion is 45° or less,
   wherein the function layer is disposed on a surface of the protective layer at an interface between the function layer and the protective layer in the region of the slope of the protective layer, and
   wherein when the maximum length of an opening of the cell is represented by A (mm), and the length of the protective layer from an end surface of the structural body is represented by B (mm), the relationship of B/A≥0.4 is satisfied.

2. The structural body according to claim 1, wherein the relationship of B/A≥1.0 is satisfied.

3. The structural body according to claim 1, wherein the relationship of B/A≥2.0 is satisfied.

4. The structural body according to claim 1, wherein the metal ions include silver as a metal species.

5. The structural body according to claim 1, wherein the function layer includes a support portion which is bonded to an inorganic framework and/or an organic framework and which is able to support the metal ions, and the metal ions are supported by the support portion.

6. The structural body according to claim 1, wherein the function layer functions as a membrane for separation.

7. The structural body according to claim 1, wherein the maximum length A of the opening of the cell is 0.5 to 10 mm.

8. The structural body according to claim 1, wherein the cell has a cross-sectional shape selected from at least one of a polygon having at least four corners, an ellipse, and a circle.

9. The structural body according to claim 1, wherein the protective layer is formed of a dense material.

10. The structural body according to claim 1, wherein the number of the cells is at least two, and the standard deviation of the B/A among the above at least two cells is 0.01 to 1.0.

* * * * *